United States Patent [19]

Kim et al.

[11] Patent Number: 5,241,693

[45] Date of Patent: Aug. 31, 1993

[54] SINGLE-BLOCK FILTER FOR ANTENNA DUPLEXING AND ANTENNA-SWITCHED DIVERSITY

[75] Inventors: Jin D. Kim, Chicago; Michael F. Moutrie, Buffalo Grove; Richard S. Kommrusch, Schaumburg, all of Ill.

[73] Assignee: Motorola, Inc., Schaumburg, Ill.

[21] Appl. No.: 840,597

[22] Filed: Feb. 19, 1992

Related U.S. Application Data

[63] Continuation of Ser. No. 428,253, Oct. 27, 1989, abandoned.

[51] Int. Cl.$^5$ .............................................. H04B 1/46
[52] U.S. Cl. ........................................ 455/82; 455/80; 455/277.2; 333/202; 333/206
[58] Field of Search .................... 455/78, 80, 82, 83, 455/84, 134, 135, 277.1, 277.2; 333/202, 206, 207, 222

[56] References Cited

U.S. PATENT DOCUMENTS

| | | | |
|---|---|---|---|
| 4,361,905 | 11/1982 | Etherington et al. | 455/80 |
| 4,464,640 | 8/1984 | Nishikawa et al. | 333/202 |
| 4,476,575 | 10/1984 | Franke et al. | 455/76 |
| 4,509,165 | 4/1985 | Tamura | 370/38 |
| 4,680,749 | 7/1987 | Englund et al. | 370/24 |
| 4,692,726 | 9/1987 | Green et al. | 333/202 |
| 4,704,734 | 11/1987 | Menich et al. | 455/277 |
| 4,716,391 | 12/1987 | Moutrie et al. | 333/202 |
| 4,740,765 | 4/1988 | Ishikawa et al. | 333/202 |
| 4,742,562 | 5/1988 | Kommrusch | 455/78 |
| 4,829,274 | 5/1989 | Green et al. | 333/202 |
| 4,879,533 | 11/1989 | DeMuro et al. | 333/202 |
| 4,914,714 | 4/1990 | Tamura | 455/78 |
| 5,010,309 | 4/1991 | Manssen et al. | 455/82 |

Primary Examiner—Reinhard J. Eisenzopf
Assistant Examiner—Edward Urban
Attorney, Agent, or Firm—Rolland R. Hackbart

[57] ABSTRACT

A single-block ceramic filter (102) is coupled to two antennas (142 and 144) for providing both antenna duplexing and antenna-switched diversity in a duplex radio transceiver (100). One antenna (142) is coupled by the filter (102) to a transmitter (132), and both antennas (142 and 144) are switchably coupled by the filter (102) to a receiver (130) by diversity control circuitry (101) in response to a diversity control signal (137). A microcomputer (134) in the transceiver (100) is coupled to the receiver (130) for monitoring the received signal strength (135). When the received signal strength (135) drops in level indicating that the signal being received on one of the antennas (142 or 144) has become degraded due to fading or other interference, the microcomputer (134) changes the binary state of the diversity control signal (137) for switching the receiver (130) to the other one of the antennas (142 or 144).

16 Claims, 4 Drawing Sheets

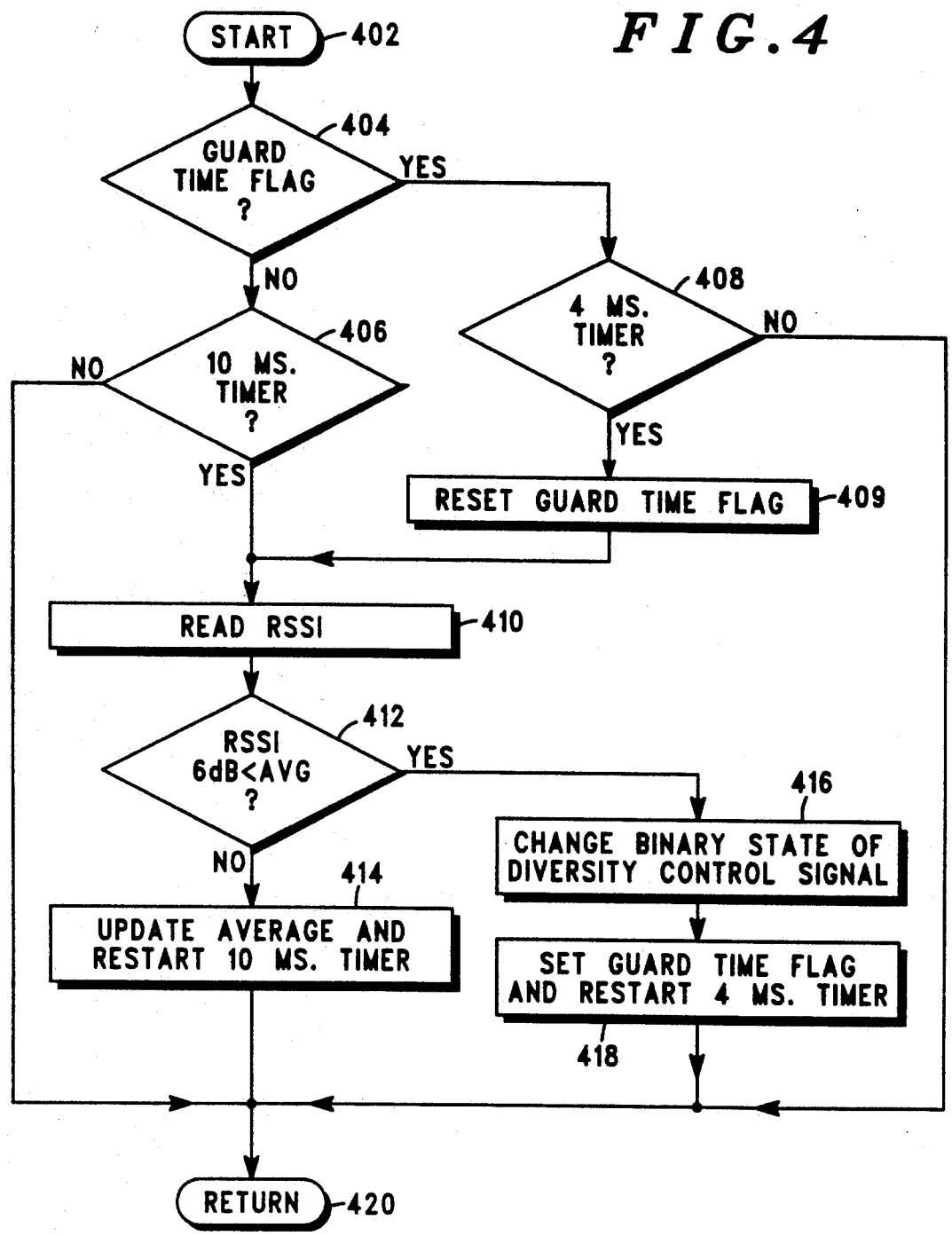

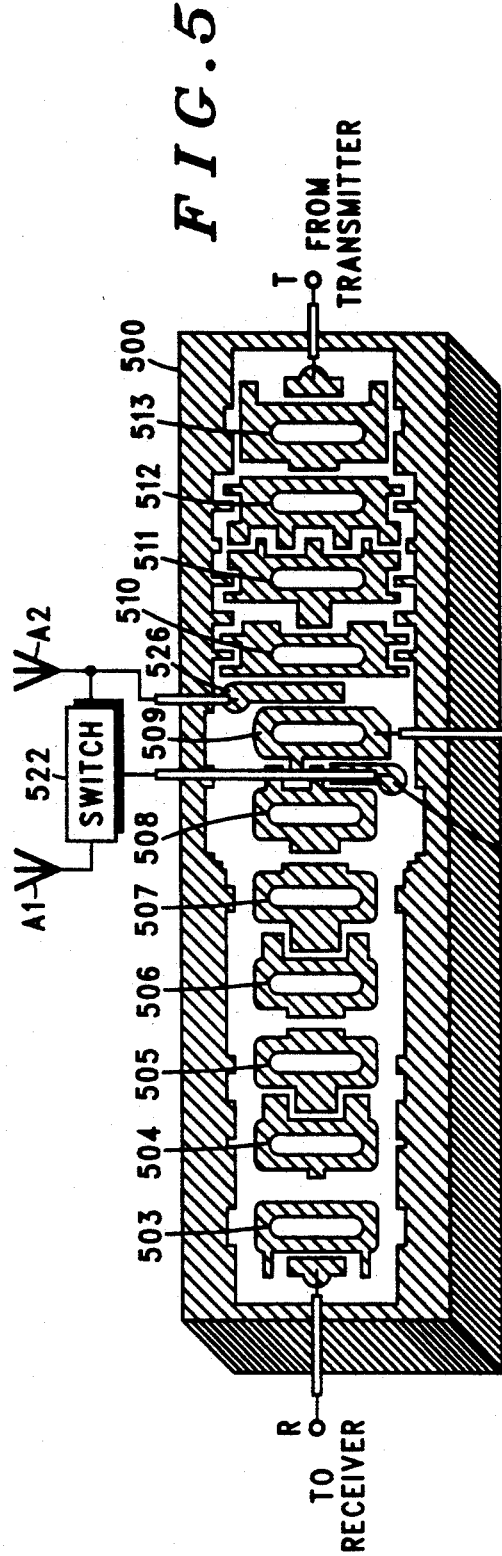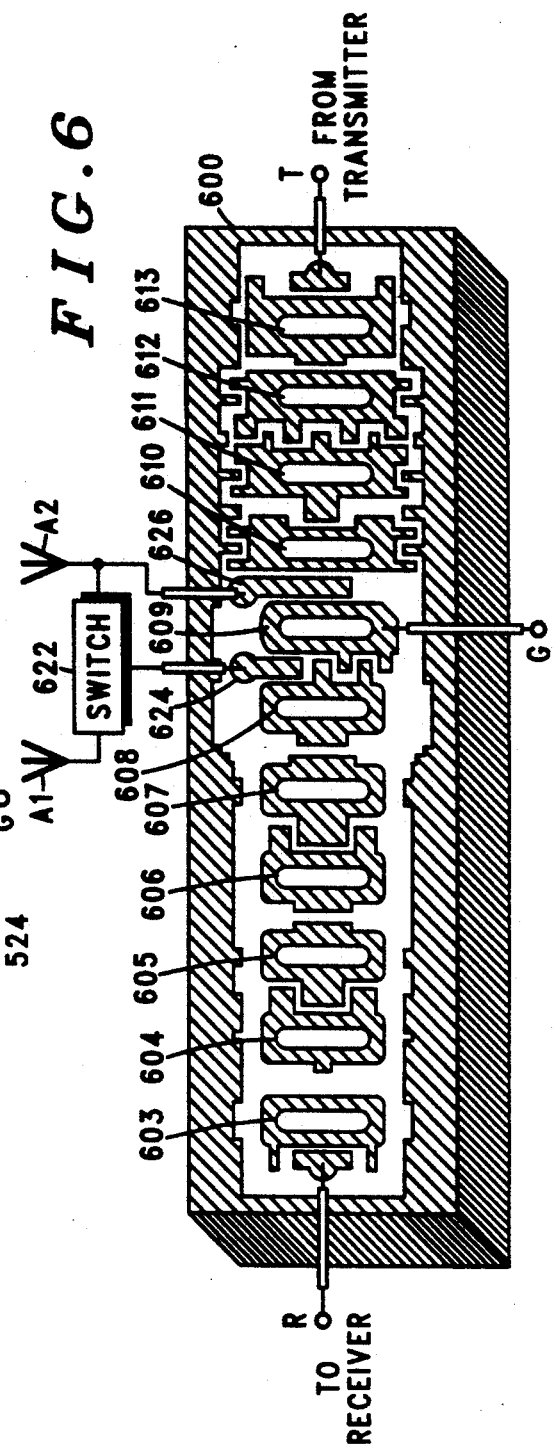

SINGLE-BLOCK FILTER FOR ANTENNA DUPLEXING AND ANTENNA-SWITCHED DIVERSITY

This is a continuation of application Ser. No. 07/428,253, filed Oct. 27, 1989 and now abandoned.

BACKGROUND OF THE INVENTION

The present invention relates generally to radio frequency (RF) signal filters, and more particularly to a single-block filter for antenna duplexing and antenna-switched diversity in duplex radio transceivers.

A prior art single-block ceramic filter for antenna duplexing is shown and described in U.S. Pat. No. 4,742,562. However, such prior art single-block ceramic filter does not accommodate antenna-switched diversity.

In the past, antenna-switched diversity has been used to minimize the effects of signal fading in mobile radio communications systems, a problem which is aggravated in cellular telephone systems due to operating frequencies above 800 MHz. According to a prior antenna-switched diversity scheme, a receiver is switched between a first antenna and a second antenna in response to detection of degradation in the received signal. This has been accomplished in prior art cellular telephones by utilizing a transmit filter and two separate receive filters and switching the input of the cellular telephone receiver between the two receive filters, or by using a transmit filter and a receive filter and switching the input of the receive filter between the two antennas. However, in both of the foregoing instances two separate filters are required.

OBJECTS OF THE INVENTION

Accordingly, it is an object of the present invention to provide a single-block filter that is capable of both antenna duplexing and antenna-switched diversity in a duplex radio transceiver.

It is another object of the present invention to provide a single-block filter having electrodes extending at least partially into corresponding resonators for coupling a transmitter and receiver of a radio transceiver to first and second antennas.

It is further object of the present invention to provide a unique coupling electrode having a flat portion extending at least partially into corresponding resonators of single-block filters for coupling signals thereto.

BRIEF DESCRIPTION OF THE DRAWINGS

FIG. 4 is a flow chart of the process used by the microcomputer in FIG. 1 for selecting between the two antennas coupled to the duplex radio transceiver.

FIG. 5 is a top view of yet another single-block filter embodying the present invention, which has two antenna electrodes.

FIG. 6 is a top view of yet a further single-block filter embodying the present invention, which has two antenna electrodes.

DETAILED DESCRIPTION OF THE PREFERRED EMBODIMENT

Figure 1:
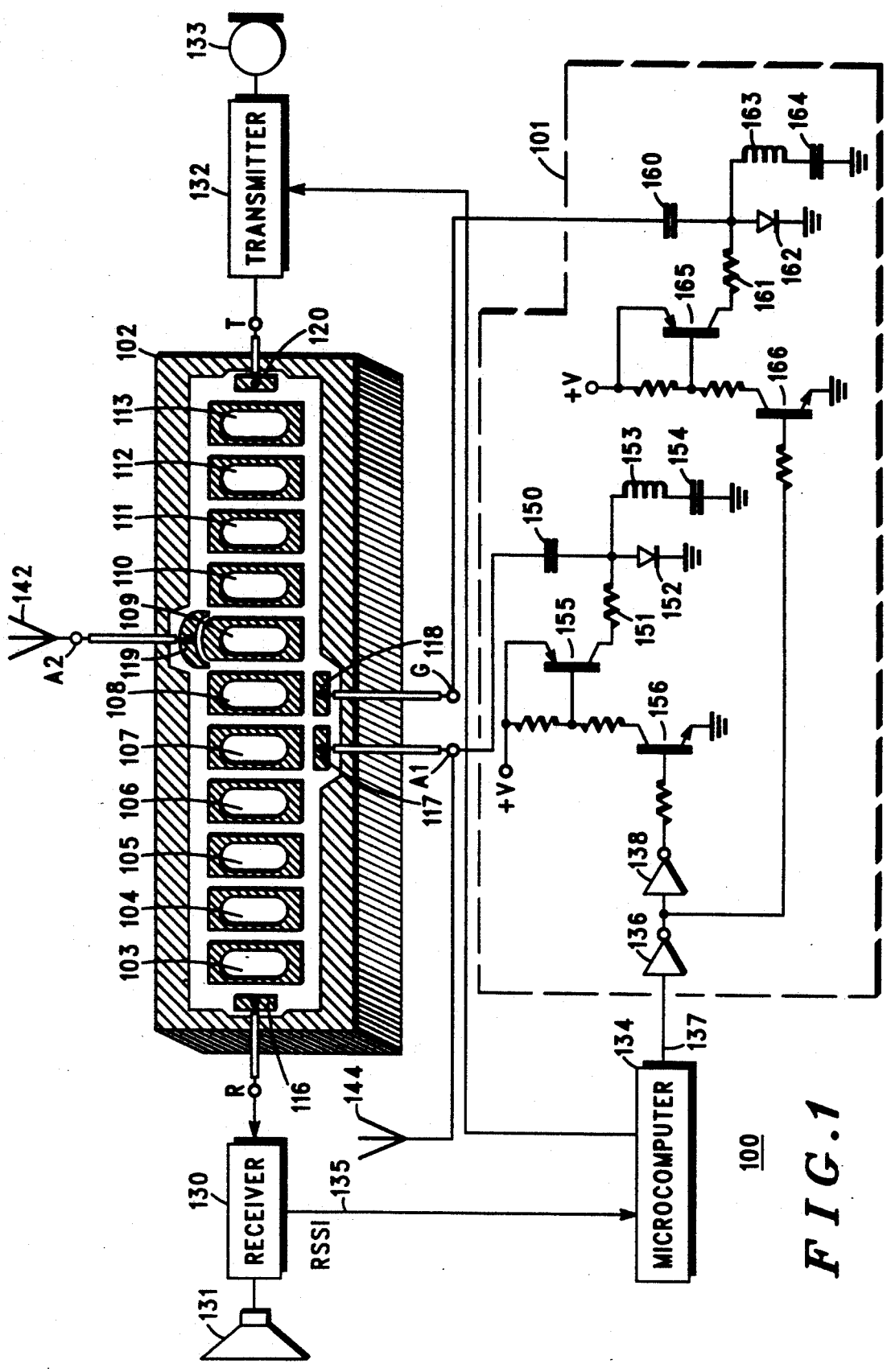
FIG. 1 illustrates a duplex radio transceiver including two antennas coupled to a single-block filter shown in perspective and embodying the present invention.

Referring to FIG. 1, there is illustrated a duplex radio transceiver 100 including two antennas 142 and 144 coupled to a single-block filter 102 shown in perspective and embodying the present invention for providing both antenna duplexing and antenna-switched diversity. Duplex radio transceiver 100 also includes receiver 130 coupled to speaker 131, transmitter 132 coupled to microphone 133, diversity control circuitry 101 coupled to antenna 144, and microcomputer 134 coupled to receiver 130, transmitter 132 and diversity control circuitry 101 for controlling the operation thereof. Blocks 130, 131, 132, 133 and 134 of transceiver 100 may be components of any commercially available duplex radio transceiver. In the preferred embodiment, transceiver 100 is the transceiver shown and described in Motorola instruction manual number 68P81070E40, entitled "DYNATAC Cellular Mobile Telephone," published by and available from Motorola C & E Parts, 1313 East Algonquin Road, Schaumburg, Ill. 60196.

According to the present invention, single-block filter 102 is coupled to antennas 142 and 144 for providing both antenna duplexing and antenna switched diversity. Antenna 142 is coupled by filter 102 to transmitter 132, and antennas 142 and 144 are switchably coupled by filter 102 to receiver 130 by diversity control circuitry 101 in response to diversity control signal 137. Microcomputer 134 is coupled to receiver 130 for monitoring the received signal strength indication (RSSI) signal 135. When the RSSI signal 135 drops in level indicating that the signal being received on one of the antennas 142 or 144 has become degraded due to fading or other interference, microcomputer 134 changes the binary state of diversity control signal 137 for switching receiver 130 to the other one of antennas 142 or 144.

Diversity control circuitry 101 includes pin diodes 152 and 162 which are switched in response to diversity control signal 137 for switching receiver 130 between antennas 142 and 144. When antenna 144 is selected, pin diode 152 is switched off and pin diode 162 is switched on to couple pad 118 of filter 102 to RF signal ground. Alternatively, when antenna 142 is selected, pin diode 162 is switched off and pin diode 152 is switched on to couple pad 117 of filter 102 to RF signal ground. Pin diodes 152 and 162 are switched on and off in response to the binary state of diversity control signal 137.

When diversity control signal 137 has a binary one state, the output of inverter 136 has a binary zero state (low voltage) and the output of inverter 138 has a binary one state (high voltage). The binary one state of the output of inverter 138 turns on transistor 156. When transistor 156 is on (conducting current), transistor 155 is turned on and applies a bias current to pin diode 152 via resistor 151. Pin diode 152 is switched on (low impedance state) by this bias current and couples pad 117 and antenna 144 via capacitor 150 to RF signal ground. Pad 117 is preferably coupled by a coaxial cable or alternatively a transmission line to capacitor 150 and antenna 144. It is also preferable that capacitor 150 and pin diode 152 be located as close to the end A1 of such coaxial cable as practical. At the same time, the binary zero state of the output of inverter 136 turns off transistors 166 and 165, keeping pin diode 162 off (high impedance state). Inductor 163 and capacitor 164 are coupled in parallel with pin diode 162 for resonating out parasitics due to pin diode 162 to achieve better open and short circuit conditions.

Conversely, when diversity control signal 137 has a binary zero state, the output of inverter 136 has a binary one state (high voltage) and the output of inverter 138 has a binary zero state (low voltage). The binary one state of the output of inverter 136 turns on transistor 166. When transistor 166 is on (conducting current), transistor 165 is turned on and applies a bias current to pin diode 162 via resistor 161. Pin diode 162 is switched on (low impedance state) by this bias current and couples pad 118 via capacitor 160 to RF signal ground. Pad 118 is preferably coupled by a coaxial cable or alternatively a transmission line to capacitor 160. It is also preferable that capacitor 160 and pin diode 162 be located as close to the end G of such coaxial cable as practical. At the same time, the binary zero state of the output of inverter 138 turns off transistors 156 and 155, keeping pin diode 152 off (high impedance state). Inductor 153 and capacitor 154 are coupled in parallel with pin diode 152 for resonating out parasitics due to pin diode 152 to achieve better open and short circuit conditions.

Filter 102 in FIG. 1 is a dielectric block filter preferably comprised of a high-dielectric low-loss ceramic. Filter 102 may also be partially enclosed in a housing, such as housing 280 shown in FIG. 2, which housing may be attached by soldering or other means producing a modular filter component. Filter 102 includes transmission line resonators formed by elongated holes 103-113 extending from the top surface to the bottom surface thereof. Holes 103-113 have a substantially rectangular cross section with rounded corners and parallel elongated sides. The bottom and sides of filter 102 and internal surfaces of holes 103-113 are covered with conductive material over substantially their entire surfaces. The top surface of filter 102 is covered by a strip of conductive material near the periphery thereof which substantially surrounds holes 103-113. Also disposed on the top surface are pads for each hole 103-113, pad 120 coupled by a coaxial cable (at end T) to transmitter 132, pad 116 coupled by a coaxial cable (at end R) to receiver 130, pad 119 coupled by a coaxial cable (at end A2) to antenna 142, pad 117 coupled by a coaxial cable (at end A1) to antenna 144 and capacitor 150, and pad 118 coupled by a coaxial cable (at end G) to capacitor 160. The pads for each hole 103-113 and pads 116-120 are likewise comprised of conductive material covering the top surface of filter 102. The pads for holes 103-113 may have varying shapes for capacitively intercoupling with one another and coupling to the surrounding conductive material at the sides of filter 102. Each of the holes 103-113 functions essentially as a foreshortened transmission line resonator. In the preferred embodiment, the conductive material covering the surfaces of filter 102 is plated thereon.

When pad 117 is coupled to RF signal ground and pad 118 is not grounded, filter 102 functions as a duplexer coupling receiver 130 and transmitter 132 to antenna 142. Conversely, when pad 118 is coupled to RF signal ground, receiver 130 is coupled via pad 117 to antenna 144, grounded pad 118 isolates receiver from antenna 142, and transmitter 132 is coupled to antenna 142. The amount of isolation provided by grounding pad 118 can be varied by increasing or decreasing the capacitive coupling between pad 118 and the pad for hole 108, by decreasing or increasing, respectively, the gap between pad 118 and the pad for hole 108, by varying the size of the opposing edges of pads 108 and 118, or by any other suitable means. The amount of coupling provided by pad 117 can likewise be varied with respect to the pad for hole 107. In other embodiments, pad 118 may be directly connected to hole 108 or may be a portion of the pad for hole 108.

Referring next to FIG. 4, there is illustrated a flow chart of the process used by the microcomputer 134 in FIG. 1 for selecting between the antennas 142 and 144. Entering at START block 402, the process proceeds to block 404, where the guard time flag is checked. If the guard time flag has a binary one state, YES branch is taken to block 408. At block 408, a check is made to determine if the four millisecond timer (4 MS) has timed out. If not, NO branch is taken to RETURN block 420 to return to other tasks. If the four millisecond timer (4 MS) has timed out, YES branch is taken from block 408 to block 409 where the guard time flag is reset to a binary zero state. Thereafter, program control proceeds to block 410 as described hereinbelow.

Returning to block 404, if the guard time flag has a binary zero state, NO branch is taken to block 406, where a check is made to determine if the ten millisecond timer (10 MS) has timed out. If not, NO branch is taken to RETURN block 420 to return to other tasks. If the 10 MS timer has timed out, YES branch is taken from block 406 to block 410 where an RSSI sample is taken. Block 410 is also reached from blocks 408 and 409 after the 4 MS timer has timed out. Microcomputer 134 includes an analog-to-digital converter for taking a digitized sample of the RSSI signal 135. Next, at block 412, a check is made to determine if the RSSI sample is 6 dB less than the average RSSI. The average RSSI is a running average taken by microcomputer 134 over the last fifty RSSI samples. If the RSSI sample is not 6 dB less than the average RSSI, NO branch is taken from block 412 to block 414 where the average RSSI is updated using the current RSSI sample, and the 10 MS timer is restarted for another ten millisecond time interval. Thereafter, program control returns to other tasks at RETURN block 420.

Returning to block 412, if the RSSI sample is 6 dB less than the average RSSI, YES branch is taken to block 416 where the binary state of the diversity control signal 137 is changed to switch between antennas 142 and 144. Next, at block 418 the guard time flag is set to a binary one state, and the 4 MS timer is restarted for a four millisecond time interval. The guard time flag is set in order to sample the RSSI signal 135 four milliseconds after switching between antennas 142 and 144. As a result, RSSI signal 135 will be sampled again after four milliseconds rather than ten milliseconds. The sampling interval is reduced in order to be sure that the antenna 142 or 144 being switched to is receiving an adequate RF signal. If both antennas 142 and 144 are receiving poor RF signals, receiver 130 will be switched from one antenna to the other every four milliseconds. Thereafter, program control returns to other tasks at RETURN block 420.

Figure 2:
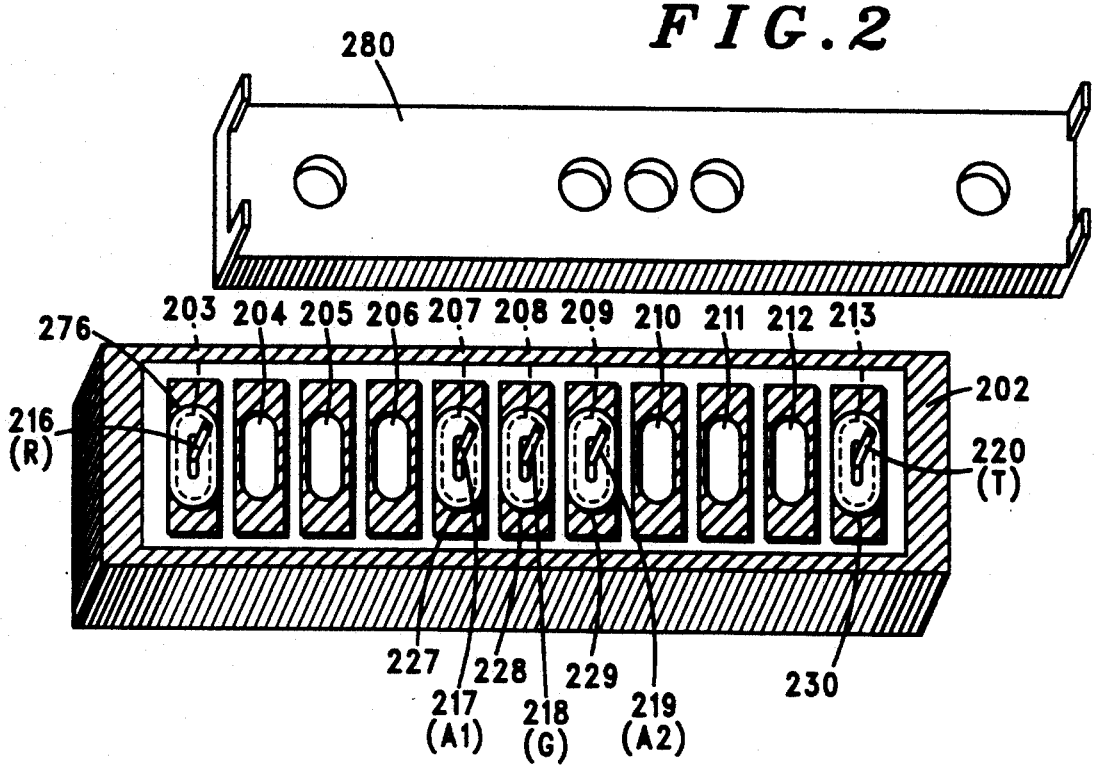
FIG. 2 is a perspective view of another single-block filter embodying the present invention.

Referring to FIG. 2, there is illustrated another filter 202 embodying the present invention. Instead of using pads for coupling signals thereto, filter 202 includes coupling electrodes 216, 217, 218, 219, and 220, which extend at least partially into corresponding holes 203, 207, 208, 209, and 213, respectively. Electrodes 216-220 are positioned and retained in holes 203, 207, 208, 209, and 213 by means of dielectric plugs 226-230, respectively. Plugs 226-230 may be comprised of any suitable dielectric, such as, for example, ceramic or plastic. Plugs 226–230 may be retained in holes 203, 207, 208, 209, and 213 by means of a press fit, glue, or other suitable means. Plugs 226–230 may also be loosely fitted in holes 203, 207, 208, 209, and 213 and retained therein by a housing 280 which extends over plugs 226–230 and has holes therein allowing electrodes 216–220 to protrude therefrom. Once housing 280 is attached by soldering or other suitable means, filter 202 may be mounted on a printed circuit board (not shown) as a modular filter component.

Figure 3:
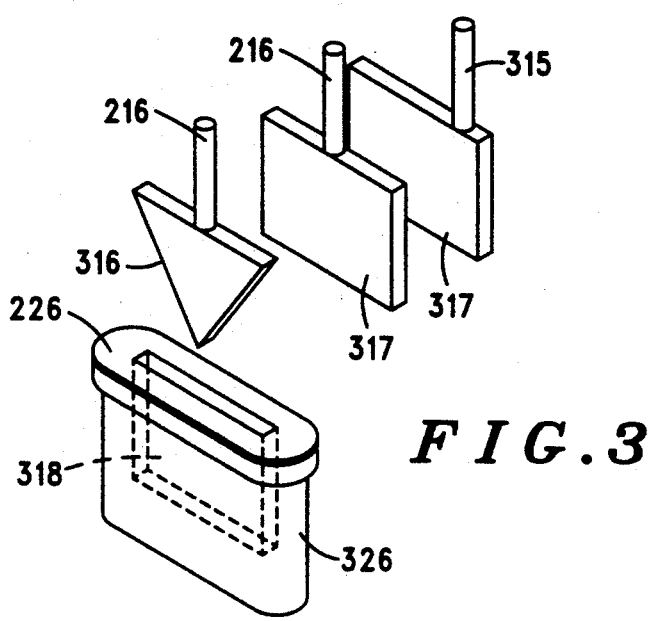
FIG. 3 is a perspective view of the coupling device used in the single-block filter in FIG. 2.

Referring to FIG. 3, there is illustrated a unique coupling electrode 216 having a pin and an elongated flat portion 316, 317 extending at least partially into a corresponding hole 203 of filter 202 for coupling signals thereto. Electrode 216 inserts into plug 326, which includes a top portion 226 and a rectangular shaped hole 318 for accepting flat portion 316, 317 of electrode 216. Electrode 216 may have a shape and size that varies for varying the amount of coupling to the resonator provided by hole 203. For example, electrode 216 may have a rectangular shape 317 or triangular shape 316. In other embodiments, electrode 216 may simply be a pin. Coupling electrodes 217, 218, 219, and 220 and corresponding plugs 227, 228, 229 and 230 may also be implemented as shown in FIG. 3.

Referring to FIG. 5, there is illustrated a top view of yet another single-block filter 500 embodying the present invention, which has two antenna pads 524 and 526. The embodiment in FIG. 5 makes better use of the isolation characteristics of filter 500. Pad 524 is a strip of conductive material located between holes 508 and 509, and pad 526 is also a strip of conductive material located between holes 509 and 510. Pad 524 extends from the opposite side of filter 500 as does pad 526. The width, length and positioning of pads 524 and 526 may be varied to vary the coupling to corresponding holes 508, 509 and 509, 510, respectively. Pad 526 couples antenna terminal A2 to resonators 509 and 510. Switch 522 is responsive to diversity control signal 137 for switching pad 524 to either antenna terminal A1 or antenna terminal A2. Switch 522 may be implemented with one or more conventional reed relays or with pin diodes and transmission line circuitry. The pads for holes 503–513 of filter 500 have varying shapes for capacitively intercoupling with one another and coupling to the surrounding conductive material at the sides of the block.

Referring to FIG. 6, there is illustrated a top view of yet a further single-block filter 600 embodying the present invention, which has two antenna pads 624 and 626. The embodiment in FIG. 6 makes better use of the isolation characteristics of filter 600. Pad 624 is a strip of conductive material located between holes 608 and 609, and pad 626 is also a strip of conductive material located between holes 609 and 610. Pad 624 extends from the same side of filter 600 as does pad 626. The width, length and positioning of pads 624 and 626 may be varied to vary the coupling to corresponding holes 608, 609 and 609, 610, respectively. Pad 626 couples antenna terminal A2 to resonators 609 and 610. Switch 622 is responsive to diversity control signal 137 for switching pad 624 to either antenna terminal A1 or antenna terminal A2. Switch 622 may be implemented with one or more conventional reed relays or with pin diodes and transmission line circuitry. The pads for holes 603–613 of filter 600 have varying shapes for capacitively intercoupling with one another and coupling to the surrounding conductive material at the sides of the block.

In summary, a unique single-block filter has been described which is capable of providing both antenna duplexing and antenna-switched diversity in a duplex radio transceiver. The unique single-block filter may include coupling electrodes and a housing for providing a modular filter component. Moreover, the single-block filter may include unique coupling electrodes having a flat portion extending at least partially into corresponding resonators thereof for coupling signals thereto. The unique single-block filter and unique coupling electrodes of the present invention may be advantageously utilized in applications where RF filtering, antenna duplexing and/or antenna diversity is desired.

We claim:

1. A filter for coupling a transmitter to a first antenna and coupling a receiver to the first antenna and, in response to a control signal from a signal source, coupling the receiver to a second antenna, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler coupling the transmitter to said first hole;

a second coupler coupling the first antenna to said second hole;

a third coupler for coupling said third hole to signal ground in response to the control signal and substantially isolating the first and second holes from the fourth and fifth holes, thereby isolating the receiver from the first antenna;

a fourth coupler for coupling said fourth hole to the second antenna in response to the control signal; and a fifth coupler for coupling said fifth hole to the receiver.

2. The filter of claim 1, wherein said third coupler includes switching circuitry responsive to the control signal for switching said third hole to signal ground.

3. The filter of claim 2, wherein said switching circuitry includes a pin diode.

4. The filter of claim 1, wherein said fourth coupler includes switching circuitry responsive to the control signal for switching said fourth hole between the second antenna and signal ground.

5. The filter of claim 4, wherein said switching circuitry includes a pin diode.

6. A radio, comprising:

a first antenna;

a second antenna;

a transmitter having an output;

a receiver having an input;

control circuitry coupled to the transmitter and receiver and producing a control signal;

a filter for coupling the transmitter to the first antenna and coupling the receiver to the first antenna and, in response to the control signal, coupling the receiver to a second antenna, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler coupling the output of the transmitter to said first hole;

a second coupler coupling the first antenna to said second hole;

a third coupler for coupling said third hole to signal ground in response to the control signal and substantially isolating the first and second holes from the fourth and fifth holes, thereby isolating the receiver from the first antenna;

a fourth coupler for coupling said fourth hole to the second antenna in response to the control signal; and a fifth coupler for coupling said fifth hole to the input of the receiver.

7. The radio of claim 6, wherein said third coupler includes switching circuitry responsive to the control signal for switching said third hole to signal ground.

8. The radio of claim 7, wherein said switching circuitry includes a pin diode.

9. The radio of claim 6, wherein said fourth coupler includes switching circuitry responsive to the control signal for switching said fourth hole between the second antenna and signal ground.

10. The radio of claim 9, wherein said switching circuitry includes a pin diode.

11. The radio of claim 6, wherein said receiver includes signal strength circuitry for producing an output signal having a magnitude related to the strength of signal received by said receiver, and said control circuitry includes processing circuitry coupled to the output signal of the receiver for producing a first binary state of the control signal when the output signal of the receiver has a magnitude at least as great as a predetermined magnitude and a second binary state of the control signal when the output signal of the receiver has a magnitude less than the predetermined magnitude.

12. The radio of claim 11, wherein said processing circuitry samples the output of the receiver at least once every predetermined time interval and thereafter produces the first or second binary state of the control signal.

13. A filter for coupling a transmitter to a first antenna and coupling a receiver to the first antenna and, in response to a control signal from a signal source, coupling the receiver to a second antenna, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler having an electrode extending at least partially into said first hole for coupling said first hole to the transmitter;

a second coupler having an electrode extending at least partially into said second hole for coupling said second hole to the first antenna;

a third coupler having an electrode extending at least partially into said third hole for coupling said third hole to signal ground in response to the control signal and substantially isolating the first and second holes from the fourth and fifth holes, thereby isolating the receiver from the first antenna;

a fourth coupler having an electrode extending at least partially into said fourth hole for coupling said fourth hole to the second antenna in response to the control signal; and a fifth coupler having an electrode extending at least partially into said fifth hole for coupling said fifth hole to the receiver.

14. A radio, comprising:

a first antenna;

a second antenna;

a transmitter having an output;

a receiver having an input;

control circuitry coupled to the transmitter and receiver and producing a control signal;

a filter for coupling the transmitter to the first antenna and coupling the receiver to the first antenna and, in response to the control signal, coupling the receiver to a second antenna, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler having an electrode extending at least partially into said first hole for coupling said first hole to the transmitter;

a second coupler having an electrode extending at least partially into said second hole for coupling said second hole to the first antenna;

a third coupler having an electrode extending at least partially into said third hole for coupling said third hole to signal ground in response to the control signal and substantially isolating the first and second holes from the fourth and fifth holes, thereby isolating the receiver from the first antenna;

a fourth coupler having an electrode extending at least partially into said fourth hole for coupling said fourth hole to the second antenna in response to the control signal; and a fifth coupler having an electrode extending at least partially into said fifth hole for coupling said fifth hole to the receiver.

15. A filter for filtering first and second signals from first and second signal sources to produce filtered first and second signals, respectively, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler coupling the first signal to said first hole;

a second coupler coupling the filtered first signal from said second hole;

a third coupler for coupling said third hole to signal ground and substantially isolating the first and second holes from the fourth and fifth holes, thereby isolating the first signal from the second signal;

a fourth coupler for coupling the second signal to said fourth hole; and a fifth coupler for coupling the filtered second signal from said fifth hole.

16. A radio, comprising:

an antenna;

a transmitter having an output;

a receiver having an input;

a filter for coupling the transmitter to the antenna and coupling the receiver to the antenna, said filter comprising:

a dielectric block comprised of a dielectric material, having top, bottom and side surfaces and having at least first, second, third, fourth and fifth holes each extending from the top surface toward the bottom surface and aligned with one another, said bottom and side surfaces and said five holes being substantially covered with a conductive material;

a first coupler coupling the output of the transmitter to one of said first hole and said second hole;

a second coupler coupling the antenna to the other of said first hole and said second hole;

a third coupler for coupling said third hole to signal ground and substantially isolating the first and second holes from the fourth and fifth holes, thereby isolating the receiver from the transmitter;

a fourth coupler for coupling one of said fourth hole and said fifth hole to the antenna; and a fifth coupler for coupling the other of said fourth hole and said fifth hole to the input of the receiver.

* * * * *